US009529770B2

(12) United States Patent
Park et al.

(10) Patent No.: US 9,529,770 B2
(45) Date of Patent: Dec. 27, 2016

(54) COMMUNICATION MODEM FOR SUPPORTING MULTIPLE INTERFACES AND METHOD OF SETTING AN INTERFACE IN THE SAME

(71) Applicant: Samsung Electronics Co., Ltd., Gyeonggi-do (KR)

(72) Inventors: Seong-Man Park, Seoul (KR); Young-Jun Choi, Seoul (KR); Joong-Ki Moon, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/290,821

(22) Filed: May 29, 2014

(65) Prior Publication Data

US 2014/0355657 A1   Dec. 4, 2014

(30) Foreign Application Priority Data

May 29, 2013   (KR) ........................ 10-2013-0061110

(51) Int. Cl.
*H04B 1/38*   (2015.01)
*H04L 5/16*   (2006.01)
*G06F 13/42*   (2006.01)

(52) U.S. Cl.
CPC ....... *G06F 13/4291* (2013.01); *G06F 13/4286* (2013.01)

(58) Field of Classification Search
CPC combination set(s) only.
See application file for complete search history.

(56) References Cited

U.S. PATENT DOCUMENTS

| 4,823,377 A * | 4/1989 | Sugiura et al. ............... 379/156 |
| 5,109,220 A * | 4/1992 | Breeden .............. H04W 88/185 340/7.29 |
| 2008/0235411 A1* | 9/2008 | Zhang ................. G06F 13/4291 710/28 |
| 2009/0074041 A1* | 3/2009 | Cappelletti .............. H04B 3/54 375/222 |
| 2012/0110200 A1 | 5/2012 | Ahn et al. |

FOREIGN PATENT DOCUMENTS

KR   10-1050282   7/2011

\* cited by examiner

*Primary Examiner* — Chieh M Fan
*Assistant Examiner* — Wednel Cadeau (57) ABSTRACT

Disclosed is a method of setting an interface in a communication modem supporting a plurality of interfaces. The method includes determining a first mode in which an interface to the device is set in advance when it is detected to receive a signal from a device connected to the communication modem. The method also includes waiting for a reception of data after integrated pins belonging to the communication modem is set to correspond to the first mode. The method also includes determining a change of the first mode according to a result of receiving the data for a predetermined time.

18 Claims, 7 Drawing Sheets

COMMUNICATION MODEM FOR SUPPORTING MULTIPLE INTERFACES AND METHOD OF SETTING AN INTERFACE IN THE SAME

CROSS-REFERENCE TO RELATED APPLICATION(S) AND CLAIM OF PRIORITY

The present application is related to and claims the priority under 35 U.S.C. §119(a) to Korean Patent Application Serial No. 10-2013-0061110, which was filed in the Korean Intellectual Property Office on May 29, 2013, the entire content of which is hereby incorporated by reference.

TECHNICAL FIELD

The present disclosure relates to a communication modem for supporting multiple interfaces and a method of setting an interface in the communication modem.

BACKGROUND

In a connection of a conventional communication modem with a peripheral device through input and output ports, a parallel mode may be ideally used only in a relatively short distance. Accordingly, when the communication modem is spaced at a long distance from the peripheral device, it is difficult to connect the communication modem with the peripheral device through the parallel mode. Therefore, a serial interface mode is generally used in the connection of the communication modem to the peripheral device. It is determined whether the serial interface mode is able to be used according to the number of devices for transmitting and receiving data to/from the communication modem, a rate of data to be transmitted and received, a distance between the devices, and a possibility of transmitting and receiving the data simultaneously. The serial interface mode includes a universal asynchronous receiver/transmitter (UART), a serial peripheral interface (SPI) bus, an inter integrated circuit (I2C), and the like.

SUMMARY

As a representative example of using the serial interface mode, the SPI mode is used in a utility smart network access port (USNAP) alliance, and the UART mode is used in an echo-net. As described above, since different interface modes and hardware pin maps are used in devices made by every manufacturer, there is a problem in that the devices cannot be physically compatible with one another with relation to each protocol. Thus, corresponding devices have a disadvantage in using an exclusive communication modem manufactured for each interface mode. Further, although devices use an identical interface mode, software is varied in the communication modem according to a profile and a protocol which the devices support. Therefore, there is a problem in that different software should be loaded in the communication modem according to a profile which the devices support.

To address the above-discussed deficiencies, it is a primary object to provide a communication modem for supporting multiple interfaces and a method of setting an interface in the communication modem.

In accordance with an aspect of the present disclosure, one or more embodiments provide a method of setting an interface in a communication modem supporting a plurality of interfaces. The method includes determining a first mode in which an interface to the device is set in advance when it is detected to receive a signal from a device connected to the communication modem. The method also includes waiting for a reception of data after integrated pins belonging to the communication modem is set to correspond to the first mode. The method also includes determining whether the first mode is changed according to a result of receiving the data for a predetermined time.

In accordance with another aspect of the present disclosure, there is provided a communication modem for supporting a plurality of interfaces. The communication modem includes integrated pins set to correspond to each of the plurality of interfaces. The communication modem also includes a controller which waits for a reception of data through the integrated pins set to correspond to the first mode. The controller is also configured to determine whether the first mode is changed according to a result of receiving the data for a predetermined time, after determining a first mode in which an interface to a device is set in advance. The controller is also configured to set the integrated pins to correspond to the first mode when it is detected to receive a signal from the device connected to the communication modem through the integrated pins.

According to the present disclosure, communication modems used for a plurality of interfaces and protocols are integrated in one piece, and an apparatus and a method of setting an interface in the integrated device are proposed. Therefore, it is possible to reduce a probability of an error in manufacturing, managing, and setting the communication modem.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter, operation principles of example embodiments of the present disclosure will be described in detail with reference to the accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms which will be described below are terms defined in consideration of the functions in the present disclosure, and may be different according to users, intentions of the users, or customs. Therefore, the definitions of the terms should be determined based on the contents throughout the specification.

Hereinafter, the present disclosure proposes a communication modem (hereinafter, referred to as 'an integrated modem') which supports a plurality of interfaces, and a method of setting interfaces in the integrated mode.

Figure 1:
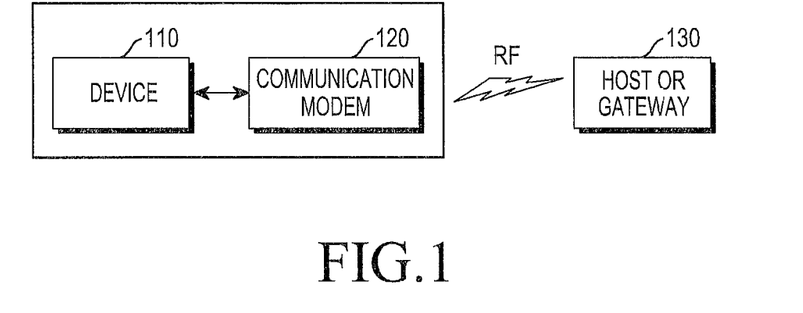
FIG. 1 illustrates a schematic configuration of a device connected to an integrated modem according to an embodiment of the present disclosure.

FIG. 1 illustrates a schematic configuration of the integrated modem and a device connected to the integrated modem according to an embodiment of the present disclosure.

Referring to FIG. 1, the integrated modem 120 supports a plurality of interfaces and a plurality of protocols, according to the embodiment of the present disclosure. Further, the integrated mode 10 is connected to a device 110 by using a corresponding serial interface mode, according to a corresponding interface or protocol. The device 110 corresponds to smart appliances, which are located in a specific space such as home, office, or the like, and take a service through a host or a gateway 130. Here, it is assumed that a mode of a serial interface supported by the integrated modem 120 includes an SPI mode and an UART mode.

The integrated modem 120 according to the embodiment of the present disclosure is provided with integrated pins capable of supporting a plurality of serial interface modes. Further, the integrated modem 120 identifies a corresponding serial interface mode depending on a voltage or a signal applied from the device 110. Accordingly, the integrated modem 120 sets the integrated pins for inputting and outputting a signal to/from the device 110 according to a pin map corresponding to the serial interface mode in which the integrated pins are identified. Furthermore, the integrated modem 120 may access a corresponding server through the host or the gateway 130 by using a communication scheme, such as a Wi-Fi communication scheme, a zigbee communication scheme, a Z-wave communication scheme, and the like, for a signal input from the device 110 through the integrated pins, which are set to correspond to the corresponding serial interface mode.

Figure 2:
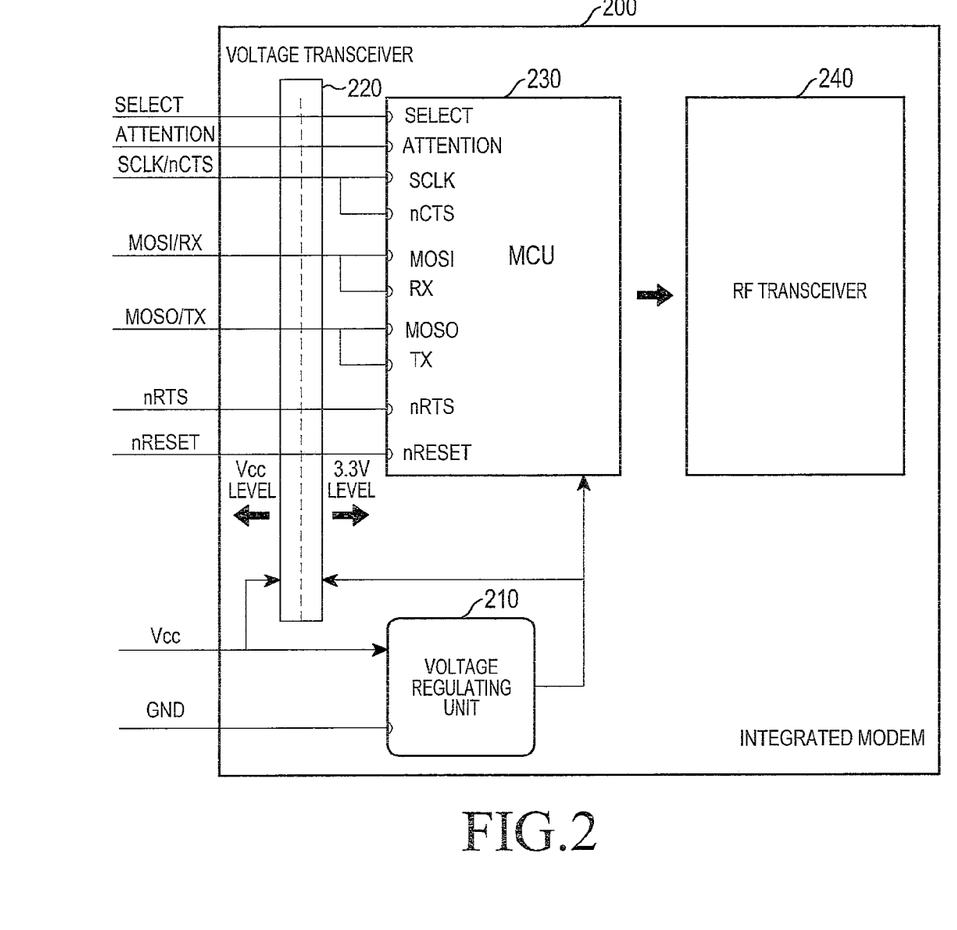
FIG. 2 illustrates a configuration of the integrated modem according to the embodiment of the present disclosure.

FIG. 2 illustrates a configuration of the integrated modem according to the embodiment of the present disclosure.

Referring to FIG. 2, the integrated modem 200 includes a voltage regulating unit 210, a voltage transceiver 220, a Micro Control Unit (MCU) 230, a Radio Frequency (RF) transceiver 240, and the integrated pins for inputting and outputting data to/from a device connected thereto by using a specific serial interface. The voltage-regulating unit 210 includes a Vcc pin and a GND pin, and is connected to the MCU 230 to supply a voltage, which is applied through the voltage transceiver 240, to the MCU 230 regardless of an external voltage.

The voltage transceiver 220 converts an input voltage of a signal input from the integrated pins into a voltage level used in the integrated modem, and a voltage of a signal output from the integrated modem into a Vcc level of a specific device. FIG. 2 shows a situation in which a voltage in the integrated modem 200 is maintained at a level of 3.3V.

When a voltage is supplied from the voltage-regulating unit 210, the MCU 230 sets a mode of a serial interface to a corresponding device through a voltage or a signal input from the device connected to the integrated pins. An operation of setting the mode of the serial interface by means of the MCU 230 will be described in detail below, according to the embodiment of the present disclosure. Further, the MCU 230 performs communication with a corresponding device in correspondence to the set mode of the serial interface.

An RF transceiver 240 transmits or receives data, which is received from the MCU 230, to/from an RF network. The RF transceiver 240 may use the Wi-Fi communication scheme, the zigbee communication scheme, the Z-wave scheme, and the like.

Further, each of the integrated pins with which the integrated modem 200 is provided is differently set according to the mode of the serial interface, which the MCU 230 sets.

Table 1 indicates an example of a pin map in each mode of the serial interface of the integrated pins with which the integrated modem according to the embodiment of the present disclosure is provided.

TABLE 1

| | | Signal | |
|---|---|---|---|
| Pin | Integrated pin (pin) | SPI mode (pin) | UART mode (pin) |
| 1 | SELECT | SELECT | RESERVED |
| 2 | ATTENTION | ATTENTION | RESERVED |
| 3 | SCLK/nCTS | SCLK | nCTS |
| 4 | MOSI/RX | MOSI | RX |
| 5 | MISO/TX | MISO | TX |
| 6 | nRESET | nRESET | RESERVED |
| 7 | $V_{CC}$ | 3.3 V | 5 V |
| 8 | nRTS | RESERVED | nRTS |

Referring to Table 1, the integrated pin includes, for example, a 'SELECT' pin, an 'ATTENTION' pin, a SCLK/ nCTS pin, a MOSI/RX pin, a MISO/TX pin, a nRESET pin, a Vcc pin for applying a voltage, a GND pin, and a nRTS pin.

First, if the serial interface for the device to which the integrated modem 200 is connected is determined to be in the SPI mode, the SCLK/nCTS pin among the integrated pins is set to be as "SLCK" pin, and the MOSI/RX pin is set to be as "MOSI" pin. Further, the MISO/TX pin is set to be as "MISO" pin. The nRTS pin is set to be as "RESERVED". The other integrated pins maintain their natural functions, respectively.

Next, if the serial interface for the device to which the integrated modem 200 is connected is determined to be in the UART mode, the "SELECT" pin, the "ATTENTION" pin, and the "nRESET" pin among the integrated pins are set to be "RESERVED". In addition, the "SCLK/nCTS" pin is set to be "nCTS" pin, the "MOSI/RX" pin is set to be "RX" pin, and the "MISO/TX" pin is set to be "TX" pin. The other integrated pins maintain their nature functions, respectively.

Figure 3:
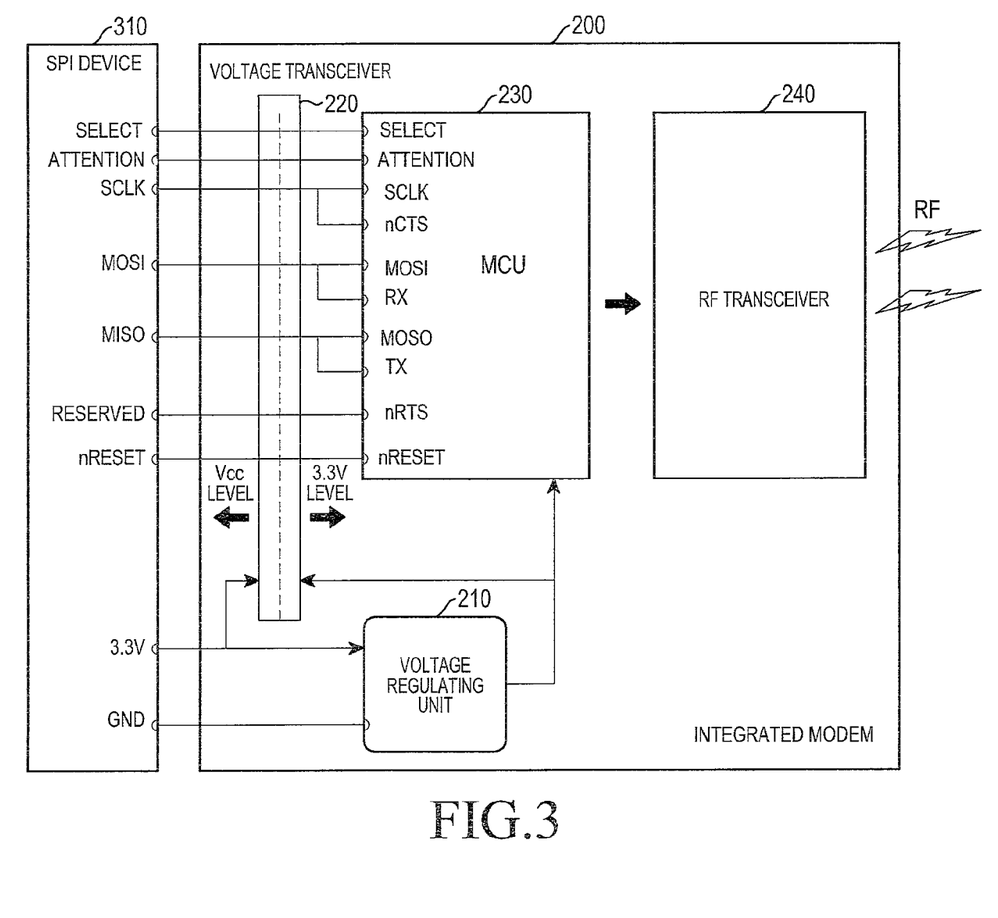
FIG. 3 illustrates an example of setting integrated pins when a serial interface of the integrated modem is in an SPI mode, according to the embodiment of the present disclosure.

FIG. 3 illustrates an example of setting integrated pins when a serial interface of the integrated modem is in an SPI mode, according to the embodiment of the present disclosure.

Referring to FIG. 3, in the situation where the integrated modem 200 is connected to the device (hereinafter, referred to as a 'SPI device') 310 which supports the SPI interface mode, an input voltage of 3.3V is supplied from the SPI device 310 through the Vcc pin by way of the voltage regulating unit 210. Alternatively, the MCU 230 sets the nRTS pin to GND to prohibit a reception of an UART interface data, and also sets the ATTENTION pin to be high in order to increase an output of the ATTENTION pin such that it is set that the ATTENTION data may be received. Accordingly, the integrated modem 200 performs communication with the SPI device 310 through the SPI interface.

Then, the MCU 230 sets the output of the ATTENTION pin to be low, and identifies a variation of the SELECT pin and the SCLK/nCTS pin for a desired time. In this event, when the SELECT and SCLK signals are received from the SELECT pin and the SCLK/nCTS pin respectively, the MCU 230 identifies that the data is currently received through the SPI interface, and continues communication through the SPI interface.

Alternatively, the MCU 230 identifies whether a timeout set to the SCLK/nCTS pin is present. If the timeout is present, i.e., it is determined that there is no reception of data through the SPI interface for a desired time, the MCU 230 changes the serial interface mode to the UART mode.

Figure 4:
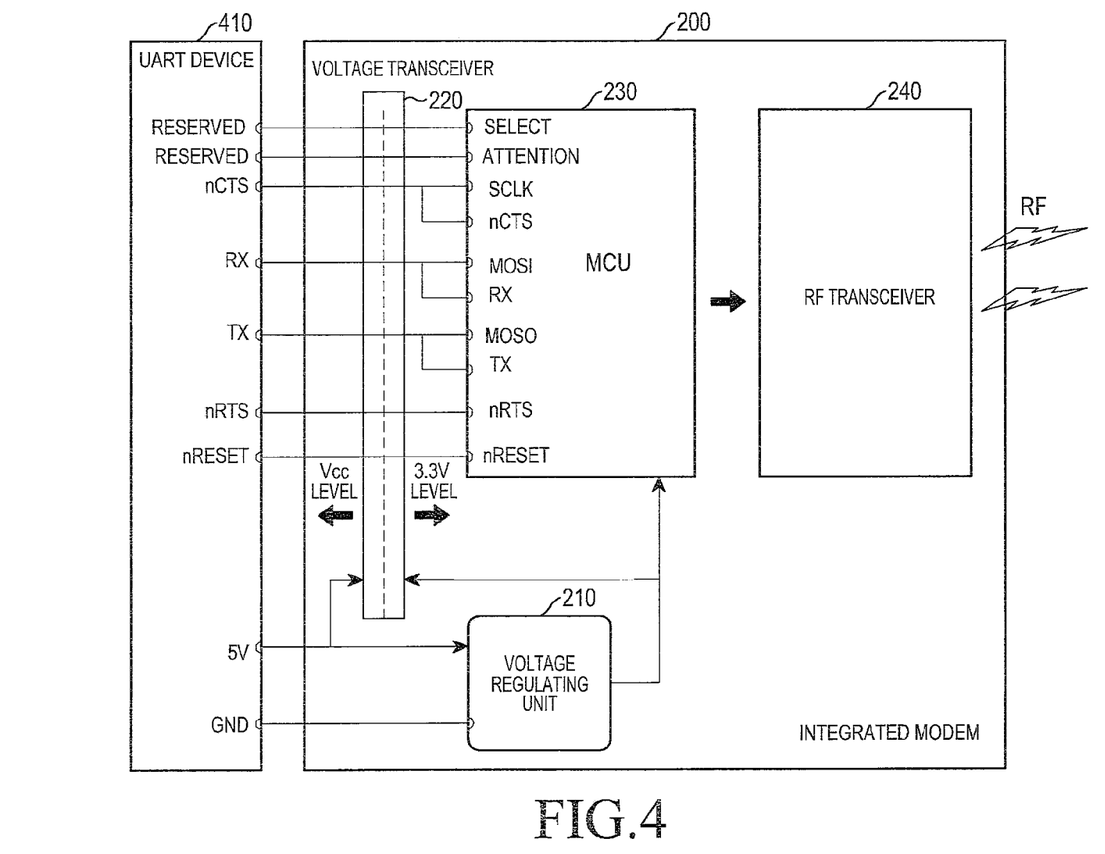
FIG. 4 illustrates a process of identifying the serial interface when the integrated modem is connected to a device for supporting a UART interface mode, according to the embodiment of the present disclosure.

FIG. 4 illustrates a process of identifying the serial interface when the integrate modem is connected to the device for supporting the UART interface mode according to the embodiment of the present disclosure.

Referring to FIG. 4, when the integrate modem 200 is connected to the device (hereinafter, referred to as a 'UART device') 410, which supports the UART interface mode, an input voltage of 5V is supplied through the Vcc pin from the UART device 410 to the voltage regulating unit 210. Thus, the voltage-regulating unit 210 converts the input voltage of 5V to the voltage of 3.3V, and supplies the converted voltage of 3.3V to the MCU 230. Then, the MCU 230 determines that the integrated modem 200 is enabled to perform communication with the device to which the integrated modem 200 is currently connected through the UART interface, and executes a sequence of initialization in order to determine a supportable profile in the UART interface. In an embodiment, the execution of the initialization sequence means that the reception of data is possible through the UART interface by setting the output of the nRTS pin to be high. Then, the MCU 230 controls to transmit an initialized packet through the predetermined integrated pins, and determines whether a response packet to the initialized packet is normally received. Continuously, the MCU 230 measures the voltage of the integrated pins which receive the response packet, and determines a corresponding profile according to a combination of the measured voltage.

Table 2 indicates profiles according to a voltage of each integrated pin in the UART mode.

TABLE 2

| URAT mode: Integrated pin/Profile | ATTENTION | MISO | nRTS |
|---|---|---|---|
| Profile 4 | Pull-down | High-Z | High-Z |
| Profile 5 | Pull-down | High-Z | Pull-down |
| Profile 6 | Pull-down | Pull-down | High-Z |
| Profile 7 | Pull-down | Pull-down | Pull-down |

Referring to Table 2, the profile of the UART mode includes four profiles, i.e., profile 4, profile 5, profile 6, and profile 7, and a corresponding profile is constituted of a combination of voltages measured at the above-mentioned ATTENTION pin, the MISO pin, and the nRTS pin, respectively. The level of the measured voltage is classified into a High-Z and a Pull-down. Here, the High-Z means a state in which the voltage is not detected although the MCU 230 is connected to a corresponding pin, and the Pull-down means a state in which the voltage to be input from a corresponding pin is detected. The detailed description of the High-Z and the Pull-down will be described later with reference to FIG. 6.

For example, the MCU 230 performs communication with the UART device 410 according to a determined profile after determining the profile corresponding to the combination of the measured voltage by measuring a combination of the voltage of the ATTENTION pin, the MISO pin, and the nRTS pin.

Figure 5:
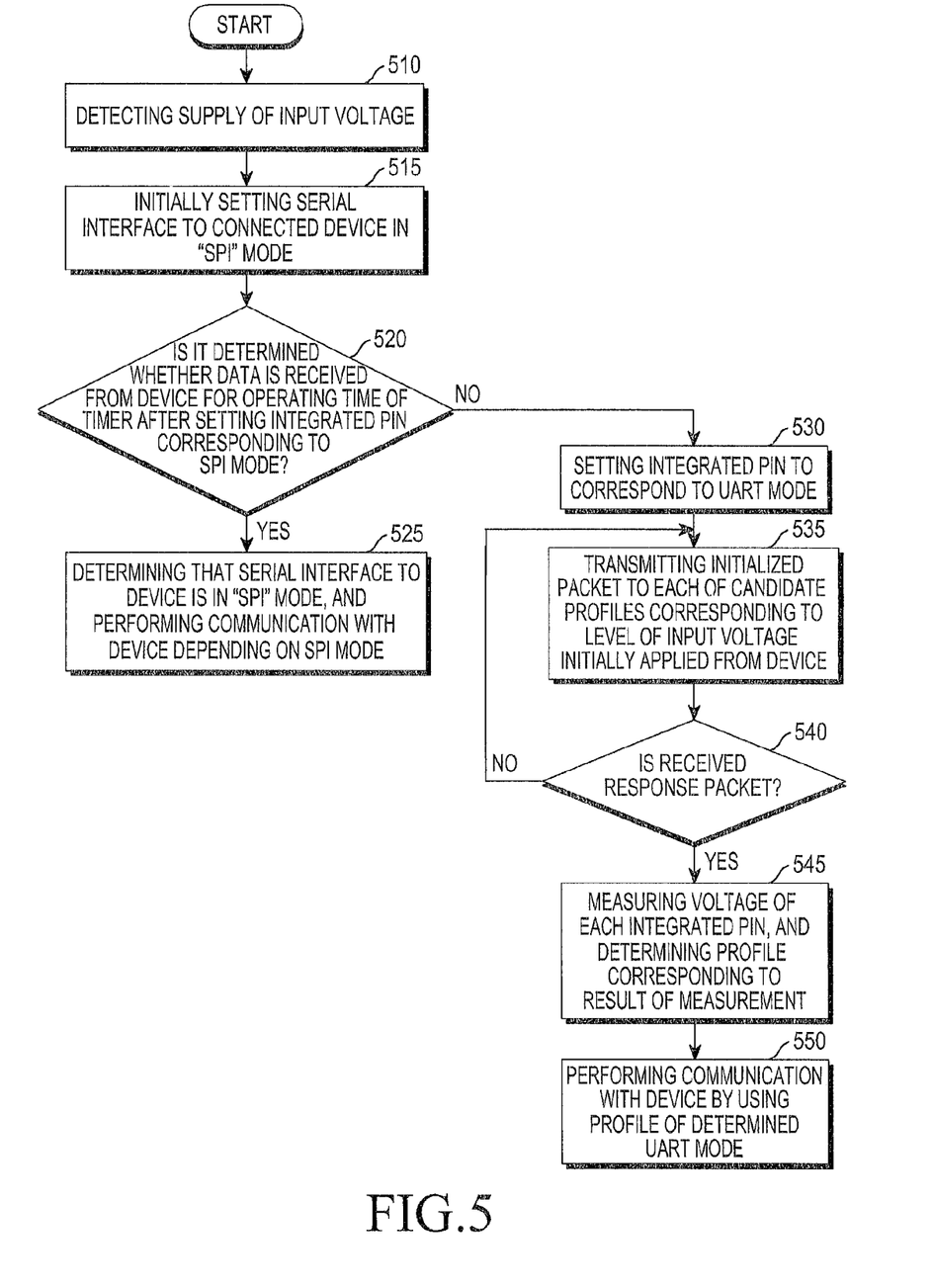
FIG. 5 illustrates a process of setting a mode of a serial interface to a device to which an integrated modem is connected, according to an embodiment of the present disclosure.

FIG. 5 illustrates a process of setting a mode of the serial interface to the device to which the integrated modem is connected according to an embodiment of the present disclosure.

Referring to FIG. 5, when detecting a supply of an input voltage from a device connected thereto in operation 510, it performs operation 515. If the integrated modem fails to detect the supply of the input voltage, the integrated modem continues to wait for the supply of the input voltage.

In operation 515, the integrated modem sets a current serial interface mode to be in the SPI mode regardless of the input voltage. In an embodiment, as the nRTS pin, which may be used only in the UART mode, among the integrated pins provided by the integrated modem, is set to be in "GND" state, and the ATTENTION pin, which may be used only in the SPI mode, is set to be in "High" state, the integrated modem initially sets the serial interface for the connected device to be in the SPI mode.

Then, in operation 520, the integrated modem starts a timer operating for a desired time, and waits to receive data from the device. The integrated modem sets the integrated pin to correspond to the SPI mode for the operation time of the timer. In an embodiment, the ATTENTION pin is changed to a "Low" state, and a change of the SELECT pin set to be in the input mode corresponding to the SPI mode for the desired time is checked while a reception of data from the SCLK/nCTS pin is waited.

Then, when it is identified that data is received from the device through the SCLK/nCTS pin until the operating time of the timer is terminated, the integrated modem determines the initially set SPI mode as the mode of the serial interface of the device in operation 525. The MCU 230 normally performs communication with the device by using the integrated pins set according to the SPI mode.

Alternatively, when the data received through the SCLK/nCTS pin is not present until the operating time of the timer is terminated, it is determined that the connected device does not support the SPI mode in operation 520. The integrated modem changes the serial interface mode into the UART mode in operation 530. That is, the integrated modem sets the nRTS pin among the integrated pins to be in a "High" state in correspondence to the UART mode, such that a state in which the data can be received in the UART mode is set. Then, in operation 535, the integrated modem performs an initialization sequence in order to determine a profile, which is supportable in the UART mode. That is, the integrated modem transmits and receives the initialized packet for each candidate profile corresponding to a level of the input voltage, which is initially applied from the device. In an embodiment, the integrated modem transmits and receives the initialized packet through the ATTENTION pin, the MISO pin, and the nRTS pin among the integrated pins.

Then, in operation 540, the integrated modem determines whether a response packet to the initialized packet is received. As the result of the determination, if the response packet is not received, the integrated modem returns to operation 535.

As the result of the determination, if the response packet is received, the integrated modem measures a voltage of a corresponding integrated pin and determines a profile corresponding to the measured result. In an embodiment, it can be assumed that the integrated modem previously knows information on mapped profiles according to a combination of the mapped voltage of each pin indicated in Table 2. Then, the integrated modem performs the communication with the device by using the UART mode according to the determined profile in operation 550.

Figure 6:
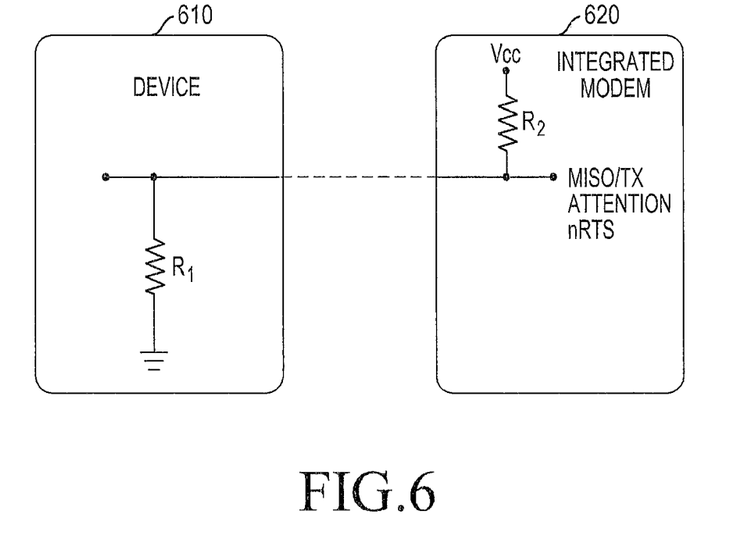
FIG. 6 illustrates a process of setting a profile determined for the device to which the integrated modem is connected, according to an embodiment of the present disclosure.

FIG. 6 illustrates a process of measuring a voltage combination of the corresponding integrated pin to set the corresponding profile in the UART mode when the device connected to the integrated modem is set to be in the UART mode according to the embodiment of the present disclosure.

Referring to FIG. 6, the integrated modem 620 sets the serial interface in the UART mode and converts the voltage of 5V input from the device 610 into a low detection voltage when the voltage input from the device 610 is 5V. Here, the low detection voltage is calculated by Equation Vcc*R1/(R1+R2), where R1 indicates resistance of a device 610 and R2 indicates resistance of an integrated modem 620. The integrated modem measures a voltage of each of the above-mentioned ATTENTION pin, the MISO pin, and the nRTS pin. In this event, the voltage level measured through the corresponding pin is determined to be one of the Pull-down state and the High state.

Figure 7:
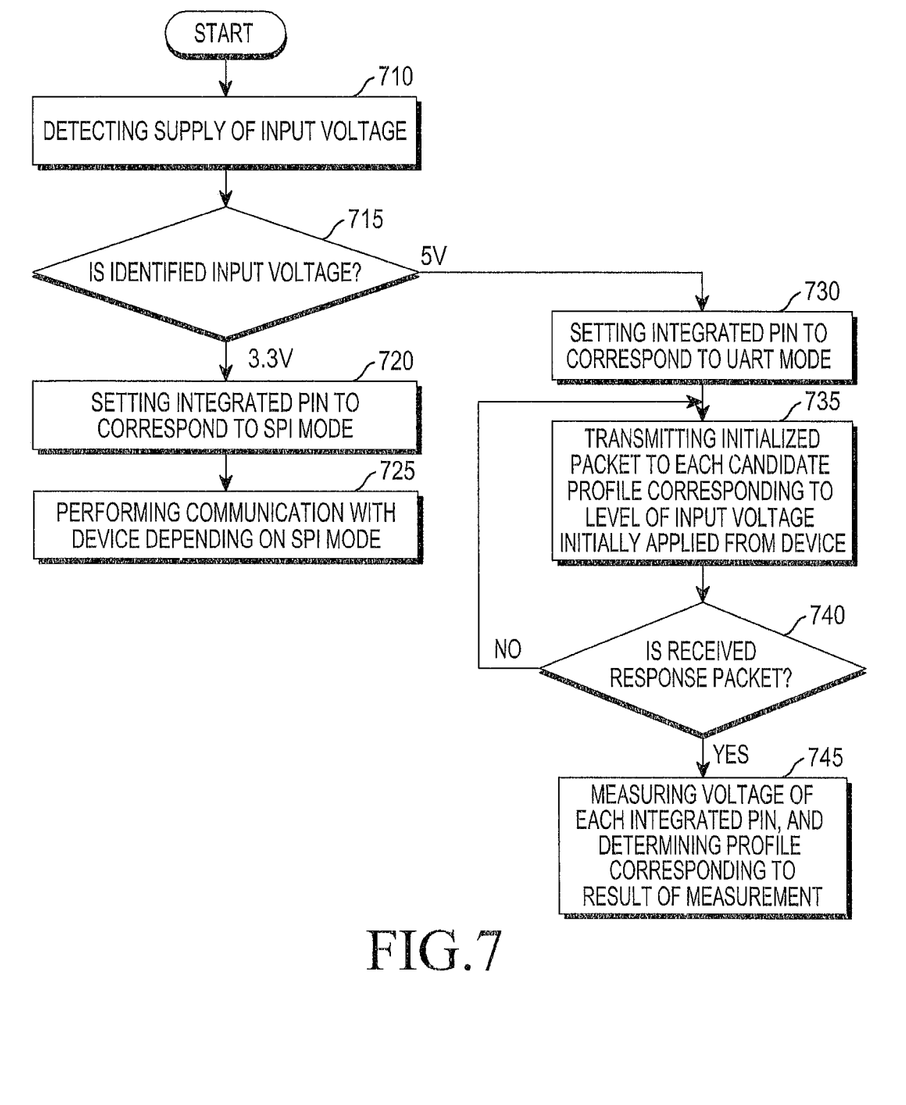
FIG. 7 illustrates a process of setting a mode of a serial interface to a device to which an integrated modem is connected, according to an embodiment of the present disclosure.

FIG. 7 illustrates a process of setting a mode of a serial interface to a device to which an integrated modem is connected according to an embodiment of the present disclosure.

Referring to FIG. 7, the integrated modem detects an application of the input voltage from the device to which the integrated modem is currently connected in operation 710.

Then, in operation 715, the integrated modem identifies what the level of the input voltage is.

As the result of the identification, when the input voltage is 5V, the integrated modem sets the serial interface to be in the UART mode, and sets the integrated pin to correspond to the UART mode.

Then, in operation 735, the integrated modem performs an initialization sequence in order to determine a profile, which is supportable in the UART mode. That is, the integrated modem transmits and receives the initialized packet for each candidate profile corresponding to a combination of the input voltage, which is initially applied from the device. In an embodiment, the integrated modem transmits and receives the initialized packet through the ATTENTION pin, the MISO pin, and the nRTS pin among the integrated pins.

Then, in operation 740, the integrated modem determines whether a response packet to the initialized packet is received. As the result of the determination, if the response packet is not received, the integrated modem returns to operation 735.

As a result of the determination, if the response packet is received, the integrated modem measures a voltage of a corresponding integrated pin and determines a profile corresponding to the measured result.

Alternatively, as a result of the identification, when the input voltage is 3V in operation 715, the integrated modem sets the serial interface to be in the SPI mode, and sets the integrated pin to correspond to the SPI mode. Then, in operation 725, the integrated modem performs the communication with the device according to the SPI mode.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of setting an interface in a communication modem supporting a plurality of interfaces, the method comprises:
   determining, by the communication modem, a first interface mode for communicating with a device if it is detected that the communication modem connects with the device;
   setting integrated pins of the communication modem based on the first interface mode to receive data of the first interface mode and to prevent a reception of data of a second interface mode;
   waiting for a reception of data of the first interface mode for a predetermined time;
   determining the second interface mode for communicating with the device if data of the first interface mode is not received for the predetermined time;
   setting the integrated pins of the communication modem based on the second interface mode to receive data of the second interface mode;
   transmitting an initialization packet to determine a profile of the second interface mode through the integrated pins set to the second interface mode; and
   determining the profile of the second interface mode based on a voltage combination of the integrated pins on which a response of the initialization packet is received.

2. The method as claimed in claim 1, further comprising: communicating with the device through the integrated pins set to the first interface mode if data of the first interface mode is received for the predetermined time.

3. The method as claimed in claim 1, further comprising:
communicating with the device through the integrated pins set to the profile of the second interface mode.

4. The method as claimed in claim 1, wherein the plurality of interfaces supports a serial interface mode of each device being enable to connecting to the communication modem.

5. The method as claimed in claim 1, wherein the integrated pin includes at least one of a SELECT pin, an ATTENTION pin, a SCLK pin, a nCTS pin, a MOSI/RX pin, a MISO/TX pin, a nRESET pin, and a nRTS pin.

6. The method as claimed in claim 4, wherein the plurality of interfaces supports a serial peripheral interface bus (SPI) mode and a universal asynchronous receiver/transmitter (UART) mode.

7. The method as claimed in claim 4, wherein the first interface mode corresponds to a serial peripheral interface bus (SPI) mode, and the second interface mode corresponds to a universal asynchronous receiver/transmitter (UART) mode.

8. The method as claimed in claim 5, wherein setting integrated pins of the communication modem to the first interface mode comprises:
setting the nRTS pin to ground to prevent the reception of the second interface mode data.

9. The method as claimed in claim 6, further comprising: determining one of the first and second interface modes as the interface for communicating with the device in response to a detection of an input voltage of the communication modem.

10. A communication modem for supporting a plurality of interfaces, the communication modem comprising:
integrated pins configured to set to correspond to each of the plurality of interfaces; and
a controller configured to determine a first interface mode for communicating with a device if it is detected that the communication modem connects with the device, to set the integrated pins based on the first interface mode to receive data of the first interface mode, to prevent a reception of second interface mode data, to wait for a reception of data for a predetermined time, to determine the second interface mode for communicating with the device if data of the first interface mode is not received for the predetermined time, to set the integrated pins of the communication modem based on the second interface mode to receive data of the second interface mode, to control to transmit an initialization packet to determine a profile of the second interface mode through the integrated pins set to the second interface mode, and to determine the profile of the second interface mode based on a voltage combination of the integrated pins on which a response of the initialization packet is received.

11. The communication modem as claimed in claim 10, wherein the controller is configured to control the integrated pins set to the first interface mode such that the integrated pins communicate with the device if the data of the first interface mode is received for the predetermined time.

12. The communication modem as claimed in claim 10, wherein the controller is further configured to communicate with the device through the integrated pins set to the profile of the second interface mode.

13. The communication modem as claimed in claim 10, wherein the plurality of interfaces supports a serial interface mode of each device being enable to connecting to the communication modem.

14. The communication modem as claimed in claim 10, wherein the integrated pin includes at least one of a SELECT pin, an ATTENTION pin, a SCLK pin, a nCTS pin, a MOSI/RX pin, a MISO/TX pin, a nRESET pin, and a nRTS pin.

15. The communication modem as claimed in claim 13, wherein the plurality of interfaces supports a serial peripheral interface bus (SPI) mode and a universal asynchronous receiver/transmitter (UART) mode.

16. The communication modem as claimed in claim 13, wherein the first interface mode corresponds to a serial peripheral interface bus (SPI) mode, and the second interface mode corresponds to a universal asynchronous receiver/transmitter (UART) mode.

17. The communication modem as claimed in claim 14, wherein the controller is configured to control the nRTS pin set to ground to prevent the reception of the second interface mode data.

18. The communication modem as claimed in claim 15, wherein the controller is configured to determine one of the first and second interface modes as the interface for communicating with the device in response to a detection of an input voltage of the communication modem.

* * * * *